May 15, 1956

WEN YUAN PAN 2,745,961

MULTIBAND UHF OSCILLATORS

Filed Nov. 3, 1951

INVENTOR
WEN YUAN PAN
BY H. W. Newton
ATTORNEY 2,745,961

MULTIBAND U. H. F. OSCILLATORS

Wen Yuan Pan, Collingswood, N. J., assignor to Radio Corporation of America, a corporation of Delaware Application November 3, 1951, Serial No. 254,686

The terminal 15 years of the term of the patent to be granted has been disclaimed 11 Claims. (Cl. 250—36)

Figure 1:
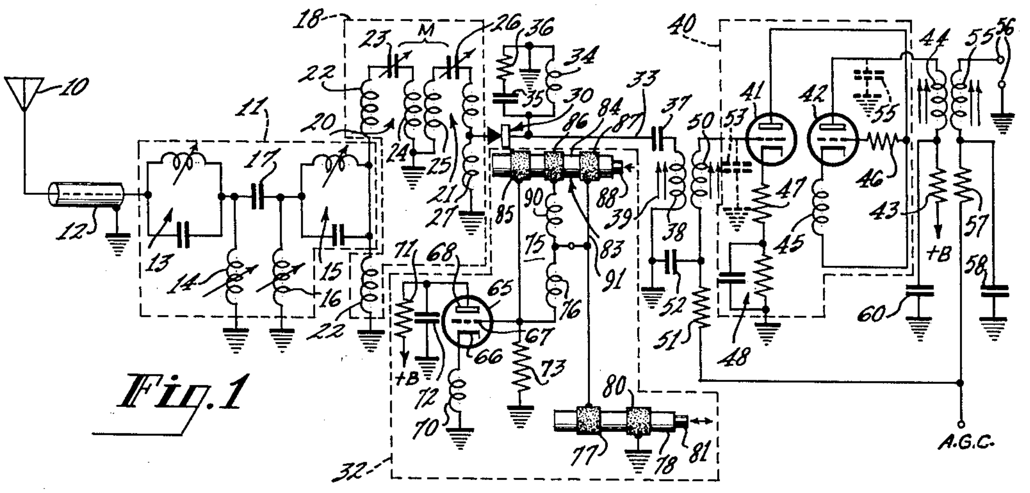

This invention relates generally to oscillation generators, and particularly relates to an oscillator circuit tunable within each of a plurality of separate frequency bands arranged within the very-high-frequency (V. H. F.) and the ultra-high frequency (U. H. F.) spectrum.

Two separate V. H. F. bands from 54 to 88 megacycles (mc.) and from 174 to 216 mc. have been allocated for broadcasting television signals corresponding to television channels 2 to 13. A new U. H. F. band from 470 to 890 mc. has been tentatively allocated for broadcasting television signals. This new U. H. F. band will accommodate television channels 14 to 83. It would, of course, be desirable to provide a television receiver for receiving television signals from any station broadcasting within the two V. H. F. bands or the new U. H. F. band.

For such a television receiver a local oscillator is required which must be tunable within each of the two V. H. F. bands and the U. H. F. band to receive desired television station. In order to switch an oscillator from one band to another band, it is conventional practice to provide pretuned circuits which are selectively switched into the oscillator. It has been found, however, that conventional contact switches are unreliable at ultra high frequencies. The leads necessary for connecting a contact switch to an oscillation generator have substantial inductance at ultra high frequencies relative to the total inductance of the resonant circuit. Furthermore, the actual contacts of the selector switches may introduce impedances of values which cannot be controlled.

It is accordingly an object of the present invention to provide a V. H. F. and U. H. F. oscillation generator which can be adjusted or tuned within two or more frequency bands separated from each other without utilizing switching means of the contact type.

A further object of the invention is to provide a frequency determining resonant circuit structure for use in a V. H. F. and U. H. F. oscillation generator which can be tuned within two or more separate frequency bands in the V. H. F. and U. H. F. spectrum.

Another object of the invention is to provide a local oscillator adapted for use in a superheterodyne receiver, the oscillator being adapted to develop waves to receive any television station broadcasting modulated carrier waves within the presently allocated V. H. F. ranges or the tentatively allocated U. H. F. range.

The oscillation generator of the present invention comprises a frequency determining circuit including a plurality of resonant shunt paths which are selectively connectible across each other. This is effected by a band switching capacitance device consisting, for example, of a plurality of conducting plates spaced and insulated from each other and a cooperating metallic band selecting core. By moving the band selecting core so that it is in register with two selected ones of the capacitance plates a resonant circuit is completed including the capacitance plates and an inductor which together form a series resonant circuit with another capacitor which is adjustable. Thus, by moving the band selecting core, the desired band can be selected and adjustment of the adjustable capacitor will tune the oscillator within each of the selected bands to a desired channel.

Figure 2:
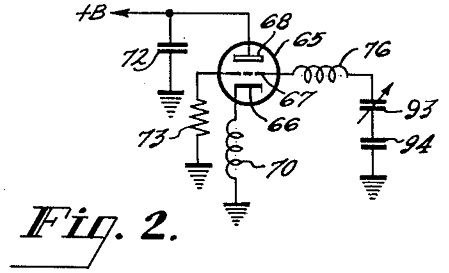
Figure 3:
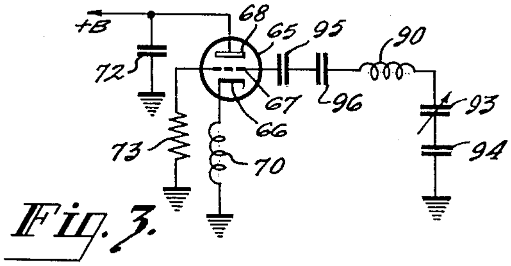
Figure 4:
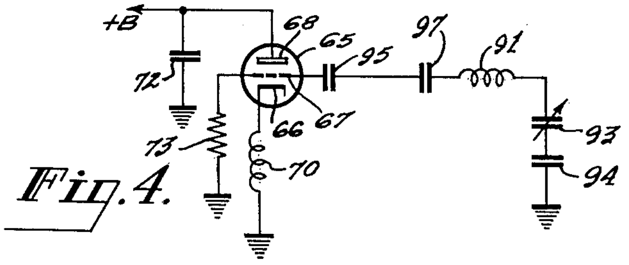

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a circuit diagram of a portion of a superheterodyne receiver including the oscillation generator of the present invention; and Figures 2–4 are equivalent circuit diagrams of the oscillation generator included in the circuit diagram of Figure 1 to illustrate its operation within three different frequency bands.

Referring now to the drawing, wherein like elements are designated by the same reference numerals throughout the figures, and particularly to Figure 1, there is illustrated a portion of a superheterodyne receiver including the oscillation generator of the present invention. The receiver includes an antenna 10 for intercepting a modulated carrier wave. The antenna 10 is connected to a high-pass filter generally indicated at 11 through transmission line 12 which may be a coaxial line as shown having its outer conductor grounded.

The high-pass filter 11 includes an *m*-derived filter section. One half of the *m*-derived filter section consists of parallel resonant circuit 13 which is bypassed to ground through inductor 14. The other half of the *m*-derived filter section comprises parallel resonant circuit 15 which is grounded through inductor 16. The two inductors 14, 16 are connected through capacitor 17 to form together a constant-*k* filter. Both the *m*-derived filter section and the constant-*k* filter form a high-pass filter which may have its cut-off frequency at 48 mc. and which may be designed to provide high attenuation at 44 mc., the latter frequency being the intermediate frequency.

The high-pass filter 11 is followed by a tunable band-pass filter generally indicated at 18. The band-pass filter 18 consists of two series resonant circuits 20, 21. The first series resonant circuit 20 includes an inductor 22 having one terminal grounded. An intermediate point of inductor 22 is connected to a terminal of parallel resonant circuit 15 or else the inductor 22 may consist of two portions as shown in Figure 1. The position of the intermediate point on inductor 22 to which parallel resonant circuit 15 is connected is chosen in such a manner as to match the impedance of the high-pass filter 11 to that of the band-pass filter 18. Series resonant circuit 20 further includes variable capacitor 23 and inductor 24 connected in series with inductor 22. The second series resonant circuit 21 also includes an inductor 25, variable capacitor 26 and inductor 27. Inductors 24 and 25 are inductively coupled as indicated at M. The two capacitors 23 and 26 may be varied in unison.

A selected modulated carrier wave is now impressed through filters 11 and 18 on the mixer 30 which may consist of a crystal rectifier as shown. One terminal of the rectifier 30 is again connected to an intermediate point of inductor 27 to match the input impedance of the mixer 30 to the impedance of the band-pass filter 18. The oscillatory wave is developed by the oscillation generator 32 which will be more fully described hereinafter. The oscillatory wave developed by oscillator 32 is radiated into space and picked up by the conductor 33 connected to the output electrode of the mixer 30.

An inductor 34 is connected between conductor 33 and ground to provide a direct current return path for the mixer 30. Capacitor 35 and resistor 36 are connected in series between conductor 33 and ground. The capacitor 35 and resistor 36 serve the purpose to equalize the oscillatory energy impressed on conductor 33 over the tuning range of the oscillation generator 32. This has been disclosed and claimed in applicant's copending application filed on August 16, 1951, Serial No. 242,161, entitled "UHF Converter" and assigned to the assignee of this application, now Patent No. 2,653,228, dated September 22, 1953. Essentially, capacitor 35 and resistor 36 present an impedance of a low and substantially constant value to the oscillatory wave which is in shunt with the mixer 30.

The output circuit of the mixer 30 for developing the desired intermediate frequency wave includes capacitor 37 and inductor 38 connected in series between conductor 33 and ground. A resonant circuit is accordingly provided including capacitor 37, inductor 38 as well as capacitor 35. The inductor 38 may be adjusted by means of a paramagnetic core 39 as indicated.

Due to the fact that the mixer or crystal rectifier 30 is a non-linear device, the sum and the difference of the intercepted modulated carrier frequency and of the oscillator frequency appears in the mixer output circuit 37, 38. This intermediate frequency wave which may have a frequency of 47 mc. is amplified by the following intermediate frequency amplifier 40 including two amplifier tubes 41 and 42 which may be triodes as shown. The first amplifier stage 41 has grid input while the second amplifier stage 42 is essentially a grounded-grid amplifier having cathode input. The amplifier 40 has been disclosed and claimed in the copending application to P. C. Swierczak filed on April 4, 1951, Serial No. 219,263 and assigned to the assignee of this application.

The two triodes 41, 42 are connected in cascade for direct currents. A suitable anode voltage obtained from a source indicated at +B is impressed through anode resistor 43 connected in series with inductor 44 on the anode of triode 42. Inductor 45 is connected directly between the cathode of triode 42 and the anode of triode 41. A grid leak resistor 46 is connected between the control grid of triode 42 and the anode of triode 41. The cathode of triode 41 is grounded through resistor 47 and bias network 48. Inductor 50 is inductively coupled to inductor 38 and connected between the control grid of triode 41 and an automatic gain control voltage source, indicated at AGC, through filter resistor 51. Filter resistor 51 may be bypassed to ground through bypass capacitor 52.

The inductor 50 resonates with capacitor 53 which indicates the grid-cathode capacitance of triode 41. An amplified signal is developed across inductor 45 which represents the anode load of the first triode 41 and is impressed on the cathode of the second triode 42. The control grid of the second triode is maintained at a substantially fixed potential and the amplified output signal is developed across inductor 44 which represents the load of the anode of the second triode 42. Inductor 44 resonates with capacitor 55 which indicates the capacitance between the anode of triode 42 and ground. The output circuit includes inductor 55 across which the output signal may be obtained from output terminals 56. Inductor 55 is magnetically coupled to inductor 44 and may also be connected to the AGC source through filter resistor 57 bypassed to ground through capacitor 58. Anode resistor 43 may also be bypassed to ground through capacitor 60.

The amplified intermediate-frequency signal is thus obtained from output terminals 56 and the amplifier 40 operates in a manner explained more in detail in the Swierczak application above referred to. The pass band of the intermediate-frequency amplifier 40 and its input and output circuits preferably is from 41 to 47 mc. provided the intermediate frequency amounts to 44 mc. The pass band extends over 6 mc. corresponding to the band width of the television signal. Inductors 44, 50 and 55 may also be tuned or adjusted by paramagnetic cores as illustrated.

The oscillation generator 32 embodying the present invention will now be described. The oscillator 32 includes amplifier tube 65 which may be a triode as shown having a cathode 66, control grid 67 and anode 68. Cathode 66 may be grounded through inductor 70. Anode 65 is connected to the anode voltage supply +B through resistor 71 and is bypassed for the oscillatory wave to ground through capacitor 72. Grid leak resistor 73 is connected between the control grid 67 and ground.

A frequency determining circuit 75 is connected between the control grid 67 and ground. As will be explained more in detail hereinafter, the frequency determining circuit or circuit structure is equivalent to a series resonant circuit and is connected between control grid 67 and ground, that is, between control grid 67 and anode 68 which is grounded for the oscillatory wave.

The frequency determining structure 75 includes inductor 76 connected between the control grid 67 and a conducting capacitance plate 77 which may be provided as a metallic or conducting layer on the outside of an insulating tube 78 such as a glass tube having a large dielectric constant. A second capacitance plate 80 is similarly provided on the outside of tube 78 spaced and insulated from the plate 77. The metallic channel selecting or tuning core 81 is movable within tube 78 and capacitance plate 80 is grounded as shown. By moving the metallic tuning core 81 with respect to plate 77, the capacitance which exists between plate 77 and core 81 can be varied. Consequently, plates 77, 80 and tuning core 81 form a variable capacitance device for selecting a desired channel.

The frequency determining circuit 75 comprises a second capacitance device generally indicated at 83 which has the purpose of selecting the desired band. The capacitance device 83 also comprises a tube 84 consisting of an insulating material such, for example, as glass having a large dielectric constant. It is provided with three conducting or metallic coatings or plates 85, 86, 87 which are spaced and insulated from each other. A metallic band selecting core 88 is movable within tube 84 and may be moved into three separate band selecting positions to be in register with metallic coating or capacitance plate 85 only or with both capacitance plates 85, 86 or finally with all three capacitance plates 85, 86, 87 (as shown in Figure 1).

Capacitance plate 85 is connected to control grid 67. Capacitance plate 86 is connected through inductor 90 to the junction point between inductor 76 and capacitance plate 77. Finally, capacitance plate 87 is connected to the same junction point through conductor or lead 91 which represents inductance at ultra high frequencies.

The operation of the oscillation generator 32 will now be explained by reference to Figures 2–4. Let it be first assumed that band selecting core 88 is moved to the left of Figure 1 so that it is in register with capacitance plate 85 only. Accordingly, inductor 90 and conductor 91 have their upper terminals floating, that is, they are both effectively disconnected. A resonant circuit structure is now formed which includes inductor 76 and the two capacitances formed between plates 77 and 80 and their associated channel selecting core 81. In Figure 2 variable capacitor 93 indicates the capacitance between the plate 77 and core 81 and capacitor 94 indicates the capacitance between the core 81 and the plate 80. Capacitor 93 has been shown to be variable to indicate that its value varies when core 81 is moved with respect to the plate 77.

The oscillation generator as illustrated in Figure 2 has a frequency determining circuit which now includes inductor 76 and capacitors 93 and 94 connected between control grid 67 and ground. Thus, the frequency determining circuit is effectively connected between the control grid 67 and the anode 68 through bypass capacitor 72. The potential of the cathode 66 is permitted to vary because it is connected to ground through inductor 70.

By way of example, the oscillation generator illustrated in Figure 2 could be used in a superheterodyne receiver designed to cover the VHF band from 54 to 88 mc. corresponding to television channels 2–6 and also to cover the frequency-modulated carrier wave band from 88 to 108 mc. Assuming an intermediate frequency of 44 mc. the oscillation generator of Figure 2 has to cover a frequency band from 101 to 149 mc. This tuning range is readily obtained by varying capacitor 93, that is, by moving the channel selecting or tuning core 81.

In order to receive a second frequency band, the band selecting core 88 is moved toward the right until it is in register with both coatings or plates 85 and 86. The thus resulting oscillator has been illustrated in Figure 3. The frequency determining circuit includes now capacitors 95 and 96 which represent respectively the capacitance between coating 85 and the core 88 and between core 88 and coating 86. The frequency determining circuit is completed through inductor 90 and capacitors 93 and 94 which again represent the capacitance between coatings 77 and 80 and tuning core 81. The reactance represented by inductor 76 at the frequency band of the oscillator of Figure 3 is so large that it may be omitted. Accordingly, as illustrated in Figure 3 the series resonant circuit connected between control grid 67 and anode 88 includes essentially capacitors 95, 96, inductor 90 and capacitors 93, 94 connected in series.

This series resonant circuit may be designed to receive television channels 7–13 corresponding to a frequency band from 174 to 216 mc. For the same intermediate frequency of 44 mc. the oscillator tuning range is from 221 to 263 mc. This tuning range is again covered by variation of the variable capacitor 93.

In order to receive the third or UHF band, the band selecting core 88 is moved into the position illustrated in Figure 1 where it is in register with all three coatings 85, 86 and 87. The resulting oscillator is illustrated in Figure 4. Capacitor 95 again indicates the capacitance between coating 85 and core 88. Capacitor 97 indicates the capacitance between core 88 and coating 87. The inductor 91 indicates the inductance of conductor 91 of Figure 1. The reactance of inductor 90 is again so large for the UHF band that it may be disregarded.

The oscillator of Figure 4 may be designed for use in a superheterodyne receiver to receive a selected station within the frequency range of 470 to 890 mc. corresponding to television channels 14–83. For the same intermediate frequency of 44 mc. the oscillator of Figure 4 must cover the frequency range from 517–937 mc. This is again effected by a variation of the variable capacitor 93, that is, by the movement of channel selecting or tuning core 81.

It will be noticed that inductor 90 and capacitors 95, 96 indicating the capacitance between coating 85 and core 88 and between core 88 and coating 86 are connected in shunt with the inductor 76. Similarly, the inductor 91 and capacitors 95, 97 indicating the capacitance between coating 85 and core 88 and between core 88 and coating 87 are also connected in shunt with the inductor 76. It will be understood that by adding more series resonant shunt paths in a similar manner the oscillation generator of the invention may be made to cover more than three separate frequency bands. Any frequency within the selected band may then be obtained by movement of the tuning core 81, that is, by a variation of the variable capacitor 93.

There has thus been disclosed an oscillation generator for developing a wave adjustable within each of a plurality of separate frequency bands. The various bands may be arranged within the VHF and UHF spectrum. Accordingly, it is possible to cover all television channels within the VHF and UHF spectrum with a single oscillator. The oscillator may also cover the frequency-modulated carrier wave broadcast range. The oscillator of the invention does not require switching means of the contact type but utilizes instead a special capacitance device to select the desired frequency band.

What is claimed is:

1. A frequency determining circuit adjustable within each of a plurality of separate frequency bands within the very high and ultra high frequency spectrum comprising a first inductor and a variable capacitor connected in series, a plurality of series circuits, each being connected in shunt with said first inductor, each of said series circuits including a further inductor and a capacitance means connected in series, the inductance of said inductors being different, each of said capacitance means having a first capacitance value of substantially zero and a second small predetermined capacitance value, and means for selectively adjusting each of said capacitance means to one of its values to provide a selected shunt path of small impedance to a wave within one of said frequency bands.

2. A frequency determining circuit as defined in claim 1 wherein three of said series circuits are provided to adjust the frequency of said wave within three separate frequency bands.

3. A frequency determining circuit adjustable within each of a plurality of separate frequency bands within the very high and ultra high frequency spectrum, said frequency determining circuit comprising a first inductor and a variable capacitor connected in series, at least two further inductors, capacitance means for selectively connecting each of said further inductors individually in shunt with said first inductor, said capacitance means providing a first capacitance value of substantially zero and a second predetermined small capacitance value between each of said further inductors and said first inductor, means for adjusting said capacitance means to a selected one of its values, said second inductor having different inductances, whereby adjustment of said capacitance means selects a desired one of said frequency bands.

4. A frequency determining circuit adjustable within each of a plurality of separate frequency bands within the very high and ultra-high frequency spectrum comprising a first inductor and a variable capacitor connected in series, a capacitance device comprising a plurality of conducting plates spaced and insulated from each other and a conductive band selecting member selectively movable into registry with a predetermined one of said plates or with a predetermined number of said plates, a first one of said plates being connected to the free end of said first inductor, a plurality of further inductors, each being connected between a further one of said plates and the junction point between said first inductor and said varable capacitor, the inductance of said inductors being different from each other, whereby movement of said band selecting member with respect to said plates connects additional circuits effectively in shunt with said first inductor.

5. A frequency determining circuit adjustable within each of a plurality of separate frequency bands within the very high and ultra high frequency spectrum, said frequency determining circuit comprising a first inductor and a variable capacitor connected in series and coupled between said other two of said electrodes, a capacitance device comprising three conductive plates spaced and insulated from each other, a metallic band selecting member selectively movable into registry with one, two or three of said plates, the first one of said plates being connected to the free end of said first inductor, two further inductors, each being connected between a further one of said plates and the junction point between said first inductor and said variable capacitor, the inductance of said inductors being different from each other, whereby movement of said band selecting member with respect to said plates selectively connects additional circuits effectively in shunt with said first inductor.

6. A frequency determining circuit as defined in claim 5 wherein an insulating tube is provided, said plates being disposed on the outer surface of said tube and spaced from each other, and said band selecting member being movably disposed within said tube.

7. A frequency determining circuit as defined in claim 6 wherein said tube consists of glass.

8. An oscillation generator for developing a wave adjustable within each of a plurality of separate frequency bands within the very high and ultra high frequency spectrum, said generator comprising an amplifier tube having an electron emitting electrode, a control electrode and an electron collecting electrode, an impedance element connected in circuit with said cathode, and a frequency determining circuit coupled between said anode and said control electrode; said frequency determining circuit comprising a first inductor, a variable capacitor including a first and a second conductive capacitance plate spaced and insulated from each other, a first conductive channel selecting member movable with respect to said first and second plates, said first inductor being connected between said first plate and one of said other two of said electrodes, said second plate being coupled to the other one of said other two of said electrodes, a capacitance device comprising a third, fourth and fifth conducting capacitance plate spaced and insulated from each other and a metallic band selecting member movable into register with one, two or three of said third, fourth and fifth plates, said third plate being connected to the junction point between said first inductor and its associated electrode, two further inductors, each being connected between one of said fourth and fifth plates and the junction point between said first inductor and said variable capacitance, the inductance of said inductors being different from each other, whereby movement of said band selecting member with respect to its associated plates selects a predetermined frequency band and movement of said channel selecting member selects a predetermined frequency with the selected frequency band.

9. An oscillation generator as defined in claim 8 wherein said channel selecting member consists of metal.

10. An oscillation generator as defined in claim 8 wherein said first and second plates consist of metal.

11. An oscillation generator as defined in claim 8 wherein an insulating tube is provided, said first and second plates consisting of metallic coatings disposed in spaced apart relationship on the outer surface of said tube, and said channel selecting member consisting of a metallic core movably disposed within said tube.

References Cited in the file of this patent

UNITED STATES PATENTS

| | | |
|---|---|---|
| 2,137,435 | Yolles | Nov. 22, 1938 |
| 2,244,023 | Sauer | June 3, 1941 |
| 2,528,167 | Pan et al. | Oct. 31, 1950 |
| 2,531,312 | Van Loon | Nov. 21, 1950 |
| 2,562,263 | Ehrlich | July 31, 1951 |
| 2,589,092 | Kihn | Mar. 11, 1952 |
| 2,645,718 | Keizer | July 14, 1953 |
| 2,687,514 | Roberts | Aug. 24, 1954 |